United States Patent
Chupp et al.

(10) Patent No.: US 6,661,905 B1
(45) Date of Patent: Dec. 9, 2003

(54) METHOD FOR TRANSMITTING DATA ON A VIEWABLE PORTION OF A VIDEO SIGNAL

(75) Inventors: Christopher Eric Chupp, Rolla, MO (US); Daniel Andrew Ciardullo, Rolla, MO (US)

(73) Assignee: Koplar Interactive Systems International LLC, St. Louis, MO (US)

( * ) Notice: Subject to any disclaimer, the term of this patent is extended or adjusted under 35 U.S.C. 154(b) by 0 days.

(21) Appl. No.: 09/535,400

(22) Filed: Mar. 27, 2000

Related U.S. Application Data

(63) Continuation-in-part of application No. 09/046,413, filed on Mar. 23, 1998, now Pat. No. 6,094,228.

(51) Int. Cl.[7] .................................................. G06K 9/00
(52) U.S. Cl. ....................................................... 382/100
(58) Field of Search ................................. 382/100, 232; 380/203, 210, 214, 216, 217, 239, 28; 713/176, 179; 348/460, 463, 461; 725/1, 90

(56) References Cited

U.S. PATENT DOCUMENTS

| | | | | |
|---|---|---|---|---|
| 3,984,624 A | * | 10/1976 | Waggener | 348/473 |
| 4,807,031 A | * | 2/1989 | Broughton et al. | 348/460 |
| 4,967,273 A | * | 10/1990 | Greenberg | 725/22 |
| 5,200,822 A | * | 4/1993 | Bronfin et al. | 725/22 |
| 5,243,423 A | * | 9/1993 | DeJean et al. | 348/473 |
| 5,404,160 A | * | 4/1995 | Schober et al. | 725/20 |
| 6,094,228 A | * | 7/2000 | Ciardullo et al. | 348/473 |
| 6,211,919 B1 | * | 4/2001 | Zink et al. | 348/473 |
| 6,356,705 B1 | * | 3/2002 | Ogino et al. | 386/94 |

* cited by examiner

Primary Examiner—Andrew W. Johns
Assistant Examiner—Shervin Nakhjavan
(74) Attorney, Agent, or Firm—Gottlieb, Rackman & Reisman, P.C.

(57) ABSTRACT

A method of encoding data in the visible portion of a transmitted video signal without degrading display of the received video signal, and for decoding the data in the received video signal. Each group of data bits to be transmitted, referred to a data symbol, is associated with one of a number of longer predetermined sequences of chips. Each chip sequence is divided into a multiplicity of lines of chips, and each line of chips together with its inverse are embedded, in pairwise fashion, in respective pairs of line scans of the video signal prior to its transmission. Received pairs of line scans are operated upon to detect the lines of chips they represent, and each of the number of chip sequences is correlated with the detected line of chips to derive a correlation magnitude. The chip sequence with the largest correlation magnitude is selected as the chip sequence whose data symbol was transmitted. The number of data lines exceeds the number of video lines required to define a video framer. In addition, each line has an amplitude which is modulated in accordance with a data carrying parameter determined by analyzing spatial and/or temporal characteristics of the video signal.

34 Claims, 5 Drawing Sheets

| PIXEL | LEFT OF 36 | 36 | 38 | 40 | 42 | 44 | RIGHT OF 44 |
|---|---|---|---|---|---|---|---|
| INTENSITY | 129 | 130 | 133 | 141 | 139 | 141 | 140 |
| SENSITIVITY (S) | X | 4 | 11 | 6 | 0 | 1 | X |
| PARAMETER (P) | | 3 | 10 | 7 | 1 | 1 | |

METHOD FOR TRANSMITTING DATA ON A VIEWABLE PORTION OF A VIDEO SIGNAL

RELATED APPLICATIONS

This application is a continuation-in-part of U.S. patent application Ser. No. 09/046,413, filed Mar. 23, 1998, now U.S. Pat. No. 6,094,228.

BACKGROUND OF THE INVENTION

Field of Invention

This invention relates to the transmission of data on a video signal and, more particularly, to the transmission of data on the viewable portion of an analog video signal wherein data symbols may be spread over several fields to enhance transmission reliability, and wherein the amplitude of the data signals is optimized without degrading the video signal.

BACKGROUND OF THE INVENTION

There have been attempts in the past to superimpose data on a video signal. The most common approach is to insert data during the horizontal and/or vertical blanking interval, such as in the generation of closed captioning signals. Another approach has been to place the data on the visible portion of the video signal. One advantage of the latter approach is that it may be perceivable to a viewer, and hence it degrades the video signal.

An example of the optical-detection approach is disclosed in Broughton U.S. Pat. No. 4,807,031. The basic technique disclosed in this patent is to represent data by raising and lowering the luminance of successive horizontal lines within some designated viewing area. Because the average luminance of the two adjacent lines remains the same, the effect is not perceptible to the eye, but sensing of the net luminance thereof by an appropriate decoder allows the data to be detected. As described in the Broughton the technique is equivalent to superimposing on the video signal a subcarrier frequency of 7.867 kHz, which can be detected by appropriate filtering. Broughton also teach how to determine which fields should have data superimposed on them. For example, according to Broughton, fields that are too white or too black are not appropriate for the insertion of data.

As used herein, the term video signal applies to any representation of the standard NTSC, PAL or SECAM signals in common use for video transmission including the analog form, directly digitized numerical representations, CCIR 601/656 standards-based digital representations, computer representations such as RGB or YUV, or other digital representations that are simply numerically converted from the directly digitized representation of standard video. (Encoding and decoding from any digitized form is contemplated as long as it can be determined how the signal was digitized and that information is not lost after digitization.)

OBJECTIVES AND SUMMARY OF THE INVENTION

It is an objective of the present invention to provide a data transmission system which is capable of transmitting data at a very high reliability.

A further objective is to provide a data transmission system which can transmit data on a visible portion of a video signal in a manner which insures that the transmission is substantially invisible.

Yet a further objective is to provide a system and method in which video signals are analyzed dynamically and the data transmission is optimized for each video frame to thereby improve the efficiency and quality of the data transmissions using a parameter determined from the analysis.

A more specific objective of the present invention is to provide a highly accurate and reliable data transmission method and means over the visible portion of a video signal by spreading data over several fields.

Yet another objective is to determine a parameter which may be time and/or spatially dependent and which is indicative of the data carrying capacity of the video signal without a degradation of the images thereof.

A further objective is to provide a method and apparatus wherein the video signal is modulated using this parameter to increase the efficiency of the transmission.

Other objectives and advantages of the invention shall become apparent from the following description of the invention.

Briefly, in the subject system and method data is transmitted in the form of groups of data bits defining symbols. Each symbol is associated with or defined by one of a predetermined number of long sequences of "chips" called PN (pseudo-noise) sequences. The PN sequence transmitted for any symbol is divided into a multiplicity of lines of chips. Each line of chips is transmitted together with its inverse, by embedding or superimposed the chips over pairs of lines of the video signal. For example, in one embodiment each symbol representing four data bits (defining $2^4=16$ symbols) may be associated with one of 16 PN sequences of 80 chips each. Next, the image over which each chip sequence is to be superimposed, is analyzed and a parameter is determined for each pixel. The parameter is used to determine an amplitude for the chip. For example, images with either sharp spatial transformations (indicative of edges) or temporary transformations (indicative of movement) can be used to transmit chips with higher amplitudes without degrading the quality of the image.

The PN sequence to be superimposed on the video signal is divided into four lines of 20 chips each. Each line of chips is modulated in accordance with the parameter and is transmitted in its normal form and with its inverse, so that eight lines of twenty chips each are added to or subtracted from respective line scans of the video signal.

Received pairs of lines are operated upon to extract the 20 chips that they represent. This is done by subtracting one line from the other in order to minimize the effect of the video, and by integrating the difference signal for the duration of each chip. Because each chip in the original PN sequence is added to one line and subtracted from the other, when one line is subtracted from the other, not only is the video effect eliminated or at least minimized, but the magnitude of the chip amplitude is doubled. After all chips are processed in this way to derive integrated chip values, the received code is correlated with each of the 16 possible PN sequences for a best match. The symbol that was transmitted is deemed to be that one whose PN sequence has the highest correlation with the received code.

In another embodiment of the invention, instead of 80 chips, each PN sequence consists of a much larger number of chips. For instances, a PN sequences may span over four fields defining two video frames. For a typical video transmission consisting of 244 lines, a PN sequence consists of 244×4×20 or 19,520 chips. In this embodiment, in the receiver each receiving frame is correlated with a test frame several times by moving the frame sequented downward, one line at a time, in case vertical sync has been lost. This transmission scheme may be used with or without the amplitude modulation previously described.

BRIEF DESCRIPTION OF THE DRAWINGS

Further objects, features and advantages of our invention will become apparent upon consideration of the following detailed description a preferred embodiment in conjunction with the drawing, in which:

FIG. 3 shows a table used to determine the chip modulation parameters P

FIGS. 5 and 6 show respectively the chips of a video signal received synchronously and shifted by two lines;

DETAILED DESCRIPTION OF A PREFERRED EMBODIMENT INVENTION

Ideally, the data is superimposed on the video signal using a chip for each data bit so that the data is transmitted at a very high rate. This approach requires that the chips have a high amplitude so that they can be detected accurately. However, the approach is difficult to achieve from a practical point without creating a visible and therefore unacceptable effect at the decoding end. Even adding standard error correction codes to a group of bits of lower amplitudes is impractical because it will generally not allow error-free decoding. For this reason, a statistical approach is taken. Instead of transmitting a chip for each bit of information, a large number of chips is transmitted for each bit. At the receiver, the received chips are compared with each symbol, and the one symbol having the highest correlation with the detected code is considered to represent the transmitted symbol, as described in detail below.

Figure 1:
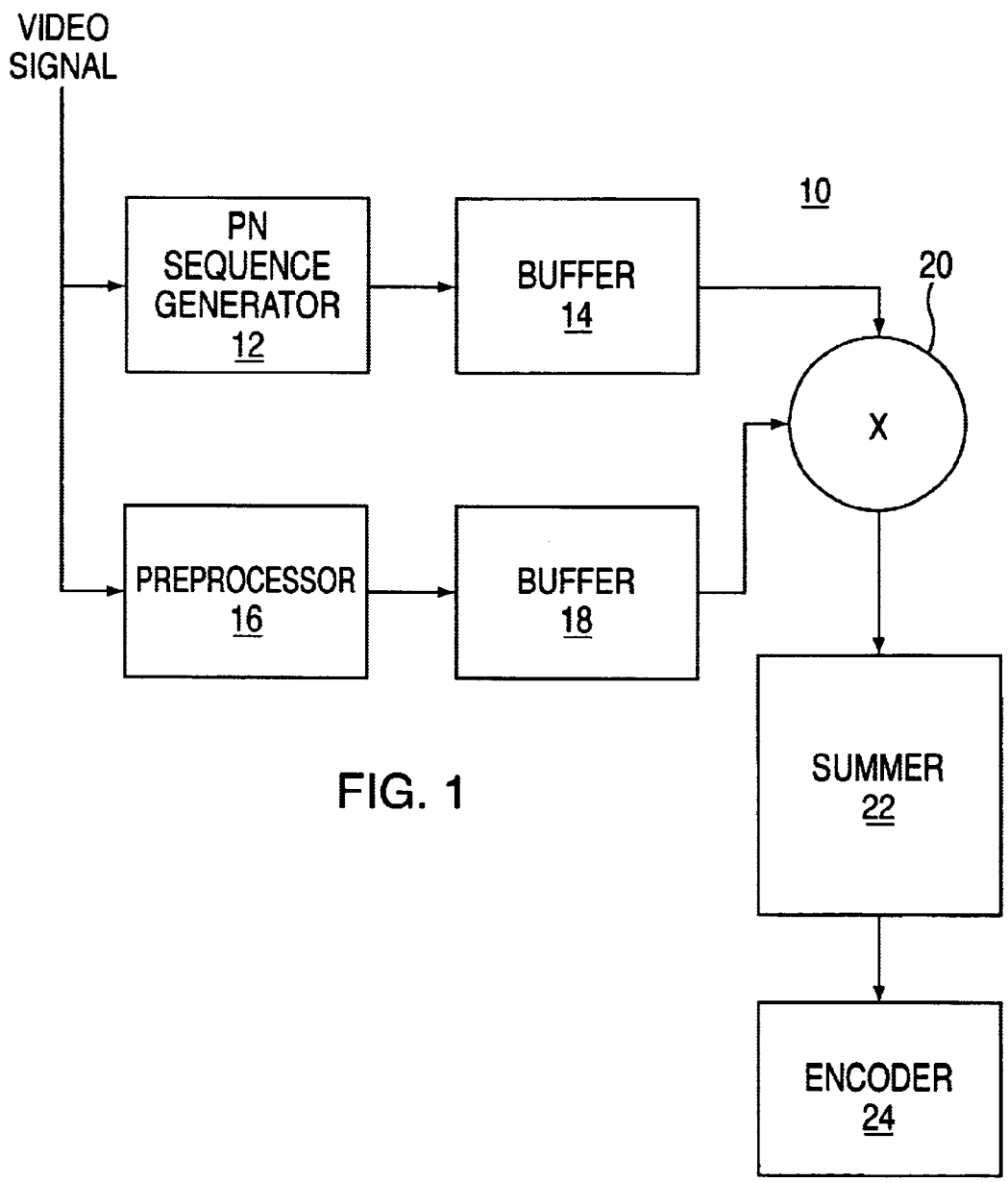
FIG. 1 shows a block of a transmitting system for superimposing a data stream on a video signal in accordance with this invention.

FIG. 1 shows a block diagram of a portion of the system constructed in accordance with this invention which is used to superimpose the data on a video signal and to transmit the same. More particularly the transmitter portion 10 of the system includes a PN (pseudo-noise) generator 12, a first buffer 14, a preprocessor 16, a second buffer 18 and a multiplier 20. The PN generator 12 receives the digital data to be transmitted and for every N binary bit, it generates each R binary chip. In the present invention, M is 4 defining 16 symbols) and R is either 80 or 19,200. As used herein, a PN sequence is a series of 1s and 0s such that the probability of a 1 or 0 is 50%, and the value of any chip does not depend on the value of the previous chip. A pseudo-noise generator of this kind, of which many are known in the art, provides a sequence of chips similar to the heads/tails sequence generated by flipping a coin, but any pattern is repeatable simply by starting the generator in the same state. That is, for every 4 bits of the incoming data, the PN generator 12 generates a PN sequence, consisting of a series of chips. Preferably, the PN generator selects these symbols and the chips defining the same using the following criteria:

a. Each PN sequence must be a true pseudo-random noise;

b. Sequential symbols must be uncorrelated to each other;

c. Alternate symbols must be uncorrelated.

d. The symbols must be selected such that chips consisting of all 1's or 0's on sequential lines must be uncorrelated.

e. Each PN sequence must be uncorrelated to another PN sequence when the two sequences differ by a field (discussed in more detail below).

A plurality of chips can be provided for horizontal video line of a video signal as described in more detail below. The chips generated by the PN generator 12 are stored in a buffer 14.

In accordance with the present invention, the transmitter section 10 determines the optimal amplitudes for the chips on a pixel by pixel basis. More particularly, in FIG. 1 the incoming video signal is fed to the preprocessor 16. This preprocessor 16 generates a parameter corresponding to pixels of the video signal frame. These parameters are stored in a buffer 18. The parameters in buffer 18 are used to modulate the amplitudes of the chips in buffer 14, via a multiplier 20. The resulting modified chips are then added to the video signals by a summer 22 and the composite video signals thus modified are transmitted to encoder 24.

Figure 2:
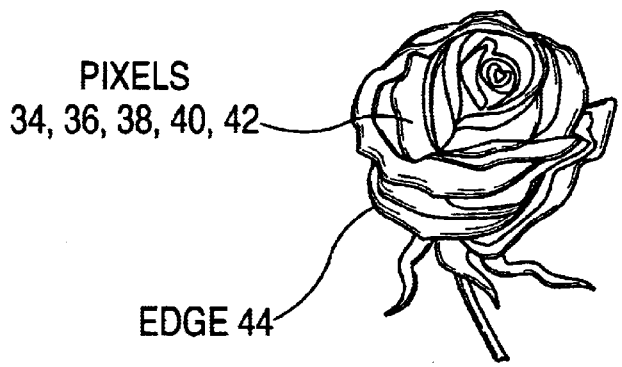
FIG. 2 shows a partial video image of a flower on which the data is superimposed.
Figures 3, 5:
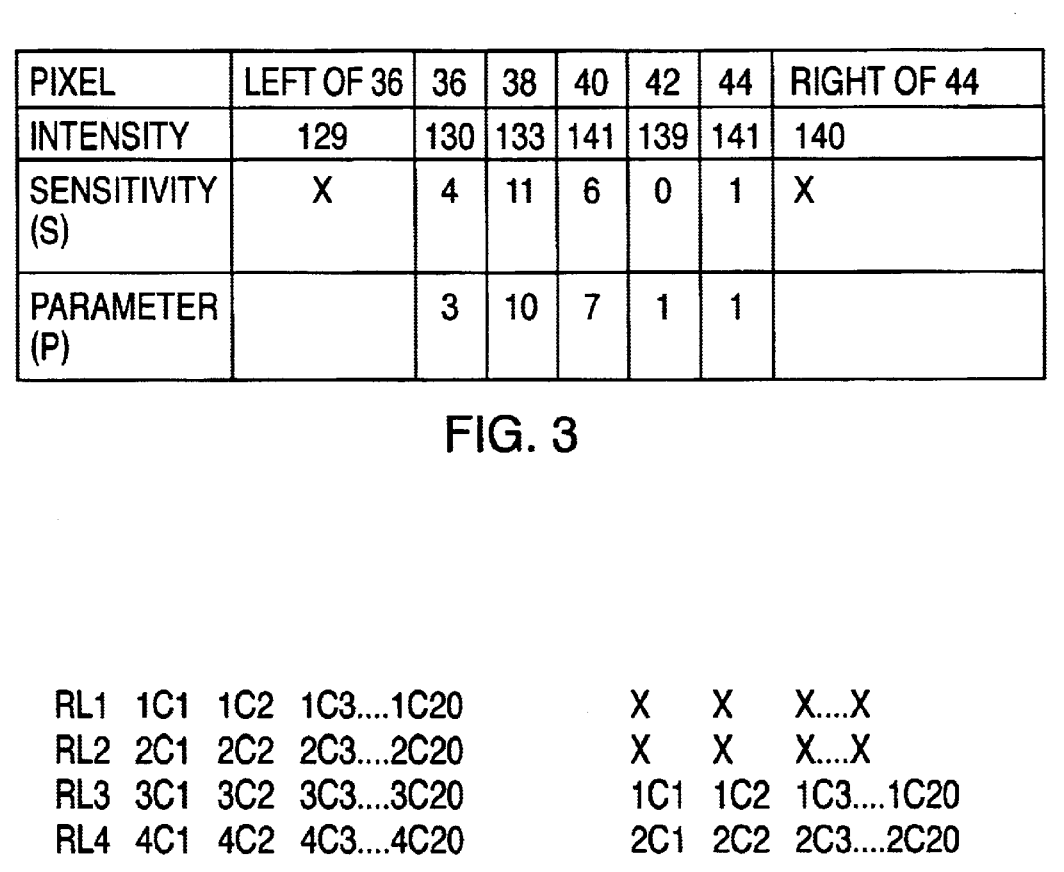

The process performed by preprocessor 16 is selected to identify dynamically pixels (and, potentially, other sections of a typical video frames) in which additional data may be tolerated without generating any substantial visible distortions. For example, substantially all video images comprise distinct areas of various colors and contrasts, which areas are delimited by well defined edge effects. For example, FIG. 2 shows a video frame with the image 30 of a flower. Five of the pixels to generate a portion of an edge 32 of image 30, are pixels 34, 36, 38, 40, and 42. These pixels are disposed along a common horizontal line. Because these pixels traverse an edge, they have different intensity levels, the digital values of these intensity values are shown in FIG. 3. (The pixels can also have different color and saturation levels, as discussed in more detail below). It has been discovered that at these edges, additional information can be superimposed or added algebraically to the pixels corresponding to the edges such as edge 32 without any visible distortion of the image.

In the present invention, for each pixel of a frame (or at least the pixels at or on the vicinity of an edge or border), a set of parameters is defined which provide a quantitative measure of how the additional data signals may be modified or modulated at, or adjacent there edges. For example, an adjusting parameter array may be generated by assigning parameter values for each pixel of the frame. The table in FIG. 3 is illustrative of how an adjustment parameter array is generated for the pixels shown in FIG. 2.

In this table, a sensitivity for each pixel is determined by taking the absolute difference between the intensity of the pixel on the right and the intensity of the pixel on the left. For example, pixel 38 has an intensity of 133, the pixel to the right of it (i.e., pixel 40) has an intensity of 141 and the pixel to the left of pixel 38 (i.e., pixel 36) has an intensity of 130, the difference being 11. An adjustment or modulation parameter is then assigned for each of these pixels. For example, this adjustment parameter may be equal to the sensitivity. However in some cases this sensitivity may be too large and accordingly it may become visible. The inventors have found that the system works well if the modulation parameter P is related to the sensitivity S as follows:

| SENSITIVITY | ADJUSTMENT PARAMETER (P) |
|---|---|
| S ≦ 1 | 1 |
| 1 < S ≦ 5 | 3 |
| 5 < S ≦ 9 | 7 |
| 9 < S | 10 |

In other words, the parameter is assigned the values 1, 3, 7 or 10 depending on the magnitude in the corresponding intensities, one such value being assigned for every pixel of a frame. For an image having a relatively uniform intensity, all the parameters have the same value of 1 in which case the system is reduced to the embodiment of the U.S. Pat. No. 6,094,228, as discussed below.

Figure 4:
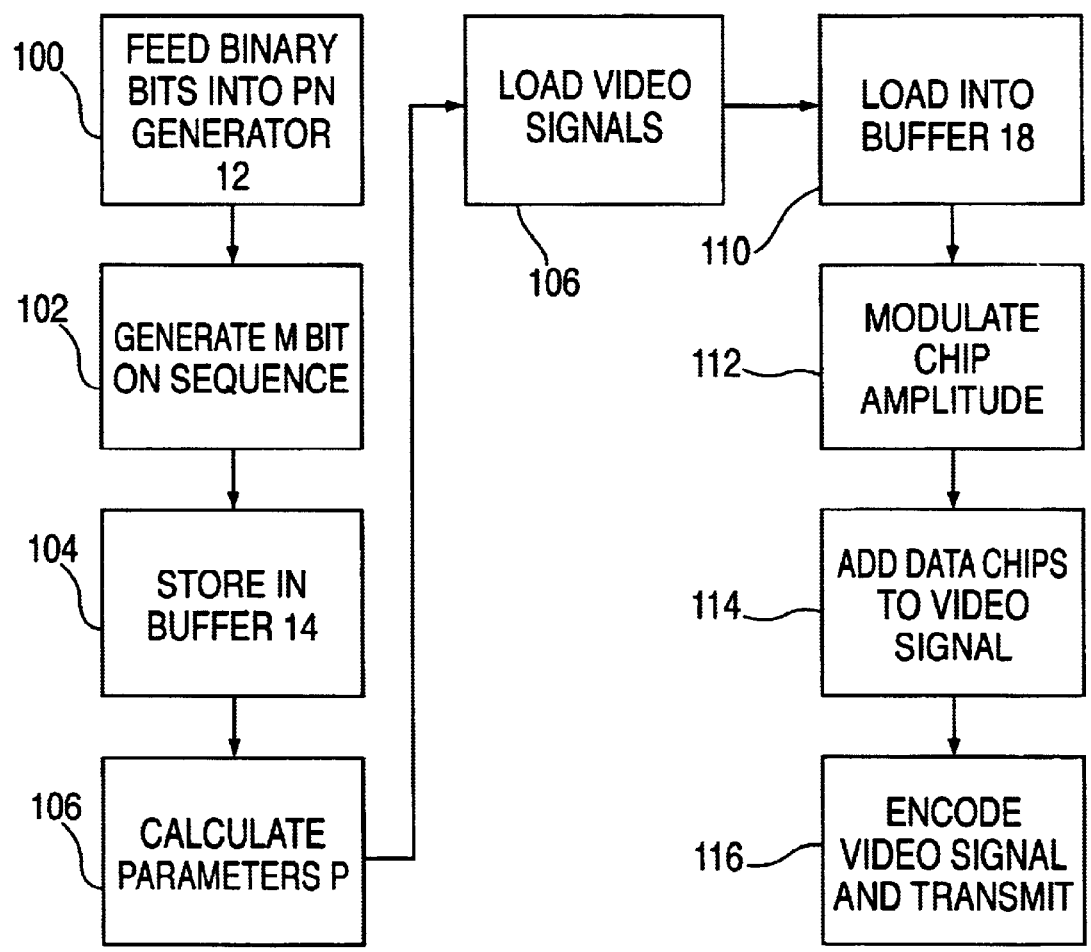
FIG. 4 shows a flow chart for the operation of the transmitter of FIGS. 1–3.

The operation of the system 10 will now be described in conjunction with the flow chart of FIG. 4. In step 100, a block of N data bits (corresponding to a symbol) are fed to the PN generator 12. As discussed above, N is typically four, defining $2^4=16$ symbols. In step 102, the generator 12 generates a block of corresponding R chip arranged to form a PN sequence in accordance with the criteria set forth above. In step 104, these M chips are stored in a buffer 14. Generally, R is much larger than N.

In step 106, a portion of the video signal sufficient to transmit the M chips is fed to the preprocessor 16. The size of this portion depends of course on the type of modulation or transmission scheme used to transmit the data. In the above-mentioned U.S. Pat. No. 6,094,228 a scheme is described wherein each symbol is transmitted by encoding eight horizontal lines of a video frame, with 4 chips being transmitted on every line. Moreover the chips are repeated on every alternate line in an inverted manner. For example, the 4-bit symbol 0101 is represented by an 80-chip PN sequence uniquely associated with this four-bit symbol. The 80-chip sequence is divided into four sub-groups. Each sub-group is transmitted twice, on two paired lines (although the lines and sub-groups need not be successive), with the second line being the inverse of the first. Thus, the first 20 chips the specified PN sequence could be 1011. Then, the first line of the video signal used to encode these twenty chips, is modified by adding a small positive voltage to the video signal for each "1" chip and by adding a small negative voltage for each "0". The second line is the inverse of the first, with a chip of value "1" giving rise to a small negative voltage added to the video signal, and a chip of value "0" giving rise to a small positive voltage added to the video signal. The next 20 chips in the PN sequence, which may be 0100, are represented on lines 3 and 4 in the same manner. It thus takes 8 lines to represent 80 chips, which in turn are associated with a 4-bit symbol.

In the present invention, the incoming signals are encoded in a similar fashion, one important difference being that instead of using single valued amplitudes for each chip, multiple valued amplitudes or steps are provided. The P parameters are determined (step 110) as indicated in the table of FIG. 3. Since 20 chips are associated with each line and each line has (in this example) 720 pixels, 36 pixels are associated with each chip. The parameters P are loaded into buffer 18.

In step 110, the parameters are used to modulate the amplitudes of the chips stored in buffer 14 one by one using multiplier 20, with chips have a binary value "1" being initially positive and chips having a binary value "0" being negative.

As described above, after the multi-valued modulated amplitudes are determined, the modified chips, are fed to the summer 22 (step 114) which superimposes these chips onto the video signal of interest. The video signal thus modified is fed to an encoder 24 for transmission as code to other locations (step 116).

In the embodiment described above, a total of 80 chips over eight lines are used to transmit each symbol. Accordingly, during a standard video transmission, many symbols can be transmitted, for each frame. More specifically, for a frame of two fields and 244 lines per field allows a transmission rate of about 61 symbols per frame. This combination of factors results in a data rate which is acceptable in some non-critical data transmission, and the symbols can be decoded with a fairly high level of confidence.

However, in some data transmission schemes, a very high degree of reliability is required even if the data transmission rate is much lower. For example, the number of lines used to encode each symbol can be expanded to cover more than one field. In another embodiment of the invention a total of 976 lines are used to transmit each symbol, which correspond to four fields and two frames. Since twenty chips are transmitted per lines, in this embodiment, each symbol is defined by 976×20 or 19,520 chips. The chips are generated by PN generator 12 using the rules set forth above.

A method and apparatus shall now be described for the second embodiment with four fields being F1, F2, F3, and F4 used to detect every symbol. This method and apparatus may be used to detect data transmitted by either the multi-valued encoding scheme illustrated in FIGS. 3 and 4 as well as a single valued encoding scheme (i.e., where the chips have a single or constant amplitude).

FIG. 5 shows the placement of a plurality of chips within a field of a received video signal as it is received and displayed by an appropriate monitor. Each of the lines received RL(1–244) carries 20 chips "C1"–C20 each chip corresponding to 36 pixels. A decoder has to analyze all the fields to determine what symbol is being transmitted. If synchronism has been lost between the transmitter and the receiver, the decoder in the receiver must also determine which one of the fields F1–F4 is being received. Moreover, because of various complications during transmission, anywhere from one to five lines could have been dropped or shifted so that line RL1 may correspond to any one of lines transmittable TL1–TL5 transmitted by the device of FIG. 1.

Several schemes may be used to detect what symbol is being transmitted at any given time. In one embodiment of the invention, a plurality of test arrays are generated for each symbol. Each test array includes four test fields TF1–TF4. Within each test field 20, test chips TCi are arranged to form test lines, the chips being encoded in the corresponding PN sequence as described above.

In other words, 16 test arrays are generating one for each symbol, each test array comprising 4 test fields, TF1–TF4, each test field comprising test lines. Each received field F1–F4 is correlated with each test field TF1–TF4 of each symbol. Under some conditions, the received field is properly synchronized, meaning that the first line of received field F1 corresponds to the first transmitted line TL1. In other situations, each received field F-1–F-4 may be shifted from 0 to 5 lines. In order to correctly identify this field and to detect the sync signal, the test fields must be shifted by one line at a time and then correlated with the received field.

Figure 7:
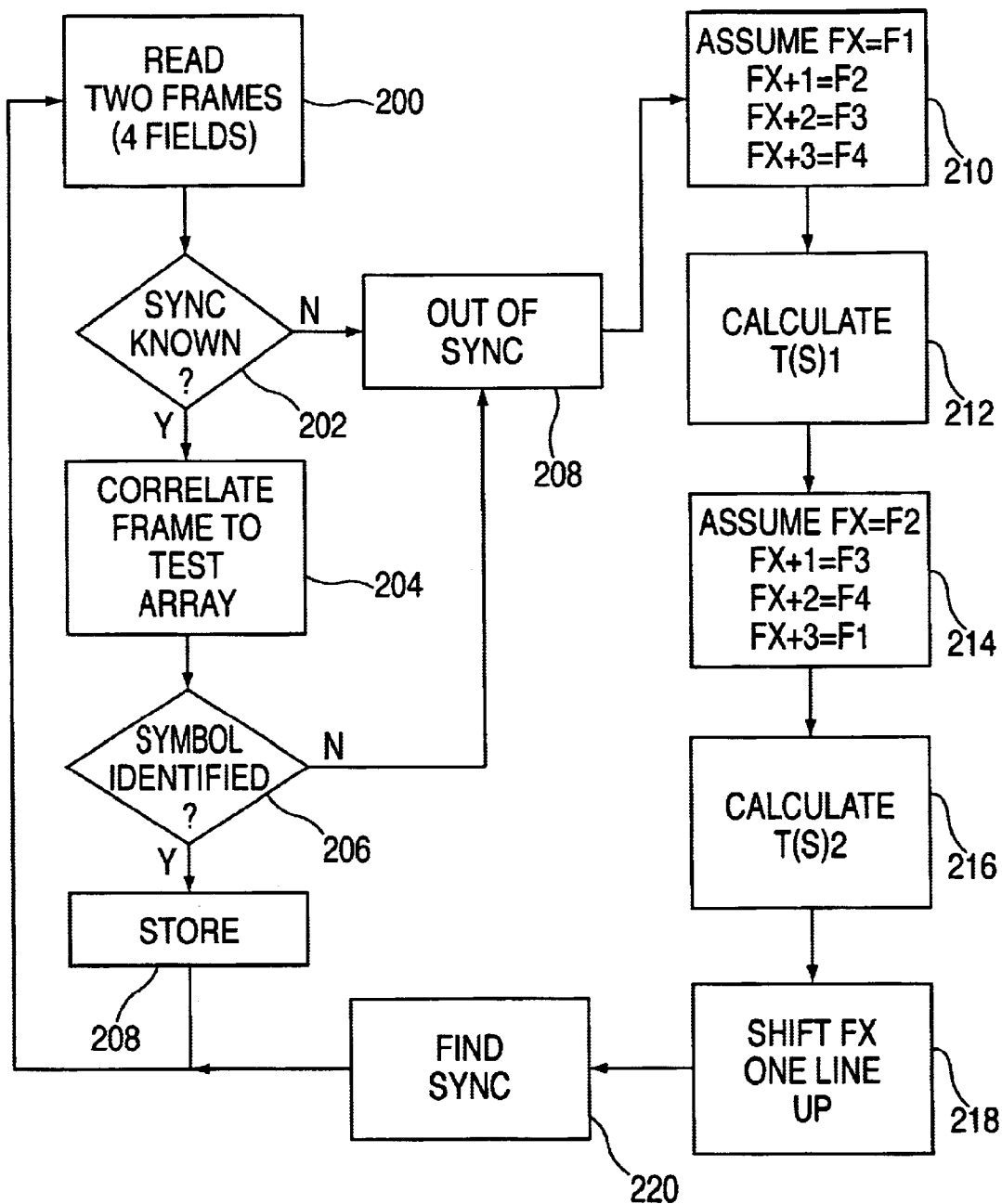
FIG. 7 shows a flow chart for decoding the data from the visual portion of a video signal in accordance with this invention.

The process for correlating the received symbols with test arrays, and to generate a sync indication, is now described in conjunction with the flow chart of FIG. 7. In step 200, two new frames (or a total four new fields F1–F4) are read (it is assumed that the incoming video signals has been digitized in a separate process). In step 202, a test is performed to determine if it can be assumed that the frames are in sync (for example, if the previous 30 frames, or the frames received during the previous 1 second are in sync).

If the frames are in sync, then in step 204, the received are correlated with the test arrays in order to determine if the frames corresponds to any of the symbols. In step 206 a test is performed to determine if a symbol has been identified using the correlations of step 204. If a symbol is recognized, it is stored as a received symbol and the next set of two frames are read in step 200.

If no symbol is recognized in step 206, then an out-of-sync flag is set in step 208 and a process is performed to detect a sync by correlating the four received fields with the test fields of all the sixteen test arrays, with each field being successively delayed by 1–5 lines.

Figure 8:
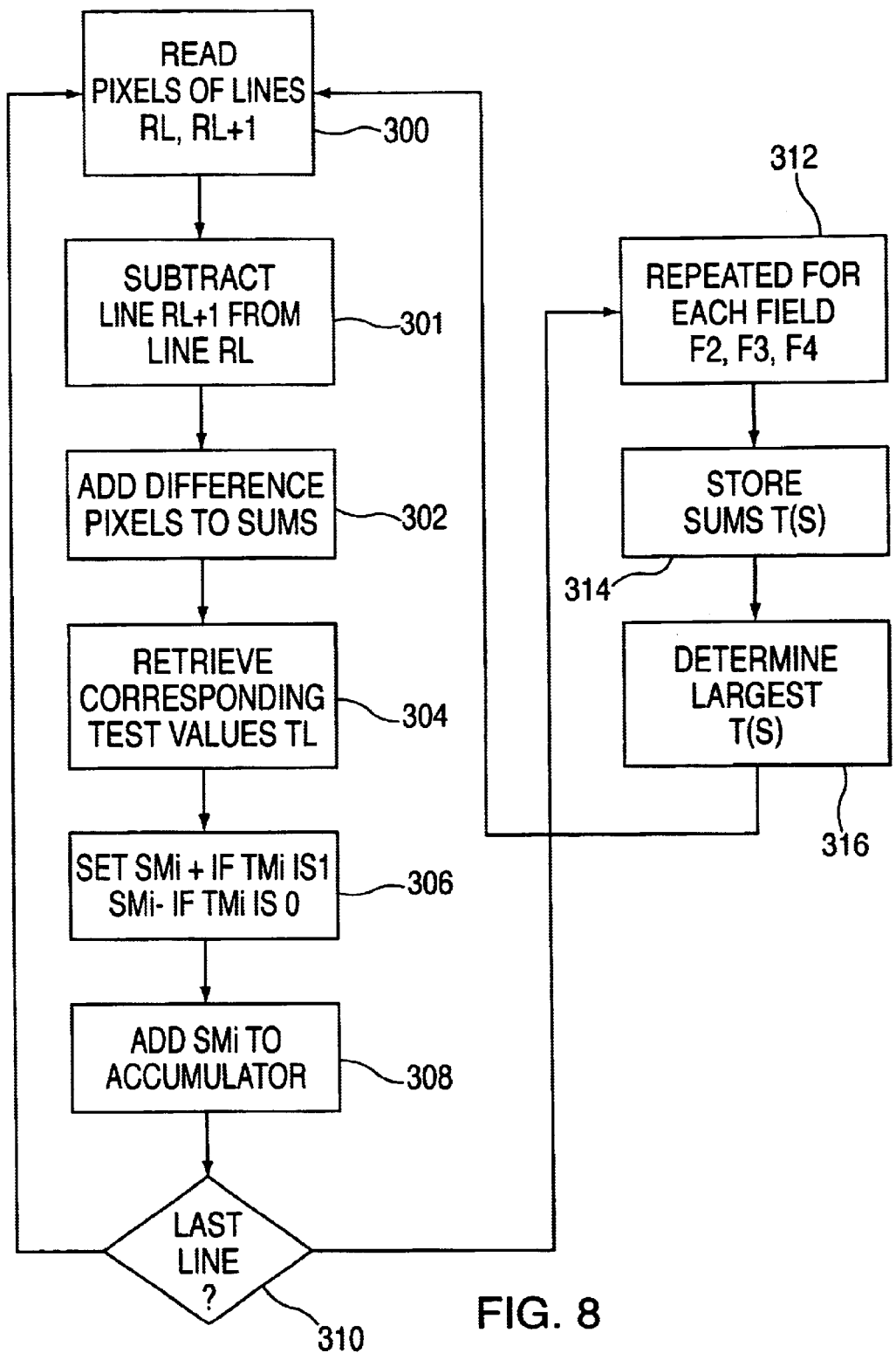
FIG. 8 shows a flow chart for a correlation process performed as part of the decoding of FIG. 7.

One method of correlating the received fields with the test fields as required in step 204 is now described in conjunction with FIG. 8, it being understood that other correlation methods may be used as well. Each received field F-1–F-4 consists of received lines, each received line comprising a plurality of chips. For example, the first received line RL1 consists of 720 pixels. Each pixel has a digital value comprising two components: A video component and a data component. The second line RL2 consists of pixels which also have a video component and a data component. However, the data component for each of these latter pixels has the opposite polarity as the data component of the previous line. Generally, it is expected that the video component of pixels in each line RL1, RL2 are substantially the same. Therefore, if the values of the pixels in the second line are subtracted from values of the pixels of the first line on a pixel-by-pixel basis, then the video component is substantially canceled while the data component is doubled. This process is repeated for all the lines of each field, the lines being processes two at a time.

More specifically, in step 300 in FIG. 8, the 20 pixels of each line RL1 and each line RL+1 are read. In step 301, the pixels of the RL2 are subtracted from the pixels of the line RL1, resulting in difference pixels D, . . . DN. When step 301 is completed for a field, there are a total of 122 lines of 720 difference pixels, one line for every two new lines of each received field F1–F4.

In step 302 the difference pixels corresponding to each chip (i.e., every 36 difference pixels on a line) are added to obtain chip sums CS1 . . . CS20. In step 304, the value of the test chip TC from a corresponding test line TL is retrieved. In step 306, a sign is assigned to each of the chip sums CS dependent on whether the corresponding value TCi is a 1 or a 0. More particularly, if a test-particular chip TCi is a binary "1", then the corresponding sum chip CS is positive. Otherwise, it is assigned a negative value. Because every two lines of a received field are used to generate the line of different chips, the total number of test lines TL in each test field is half the number of lines of each received field. Next, in step 308 each sum chip CM is added to an accumulator. In step 310, a test is performed to determine if a last line for a given field has been reached. If it is not, then steps 300–310 are repeated for the next line of chip sums.

When the last line of the first field F1 is reached, the chips for the next field F2 are processed in step 312 in a similar manner until the lines of all four fields F1–F4 are processed. The sums thus obtained are added to an accumulator for each line of each field, using the data from the test array, as discussed above. In step 314, a grand total T(S) obtained for each of the symbols is stored. As previously mentioned, a different test array is defined for each symbol S1–S16. In step 316, the totals for each symbol S are compared and the largest total T(S) used as a designation to the symbol S as the transmitted symbol.

In this manner the data signals transmitted to the receiver are decoded using the four fields.

If video signals received are not in sync, as determined in step 202, or if sync is lost, as determined in step 206, then the procedure outlined in FIG. 8 is performed to insure that the data on the received video signal is properly synchronized. When synchronization is lost, two problems must be addressed. First, as each a video signal is received, it is not known whether its initial field (at the initiation of transmission, or loss of synchronization) is field F1, F2, F3 or F4 of any of the symbols S. Second, as mentioned above, due to various transmission problems, the received signals may be shifted vertically up to five lines. More particularly, a typical received field may consist of a chip array as shown in FIG. 6A with the first line comprising chips 1C1, 1C2 . . . 1C20, the second line comprising chips 2C1, 2C2 . . . 2C20, and so forth. However, if the received field may be shifted downwards, so that for a two-line shift, the first two lines may be blank or may consist of chips from previous symbols, and chips 1C1, 1C2 . . . 1C20 appear on line RL3, chips 2C2, 2C4 . . . 2C40 appear on line RL4, and so on.

Referring now to FIG. 7, in order to establish sync in step 210, it is assumed that the first field F is F1, the next field F+1 is F2, the next field F+2 is F3 and the next field F+3 is F4. In step 212, a test total T(S)1 is calculated for each symbol S as set forth above and in FIG. 8. Next, it is assumed that field F is F2, F+1 is F3, etc., (step 214) another total T(s)2 is calculated (step 216). This process is reprinted twice with the assumptions that F=3 and F=4. Next, the field F is shifted up by one line (step 218), so that the chips on line RL2 are moved to line RL1. The initial chips on line RL1 are discarded. Steps 210–216 are now repeated with this new field. Next, the field is shifted up by another line, and steps 210–216 are again repeated. F is shifted up in this manner for up to five times, and 4×16×5, or 320 total sums are calculated. In step 220, the largest total sum is determined and used to determine the correct order of the field and its correct vertical alignment and how the word processing can be started.

Once the incoming video signal sequence is determined, it is tested against each of the possible PN sequences one by one. Rather than to perform each PN sequence test individually, custom hardware can be employed to process all of them in parallel. In the illustrative embodiment, the analog-to-digital converters are 10-bit devices. It is possible to use 8-bit converters, although this would increase the probability of error since the encoded signal is quite small.

While in the illustrative embodiment of the invention consecutive lines for each PN sequence are paired, it is possible to interleave the PN sequences differently. It is necessary that each PN sequence be sent in its normal and inverse forms because integrated chip values must be derived; two oppositely encoded lines must be subtracted from each other in order to get rid of the video in the hope that what remains reflects just the data signal. It may also be preferable to separate lines of a pair by a few lines because the error rate may improve, in the unlikely situation that "bad" portions of the video will cover a number of lines in succession. In other words, if a portion of the PN sequence is corrupted, it is better that both lines of a pair not be corrupted. However, the paired lines should not be separated too much because it is desired to keep the average luminance unchanged, and the subtraction process works best if the video signals on the two lines of the pair are similar (which they are more likely to be if the lines are adjacent). Therefore, as used in the claims, "paired" lines should be within about five lines of each other. The consecutive line method is preferred, however, because it is the simplest and requires the least computer memory to implement.

Instead of modulating the luminance portion of the video signal as described above, it is possible to modulate the chrominance. In fact, it is possible to modulate both and thus double the data rate, especially since the chrominance and luminance signals do not interfere too much with each other. It may also be that the chrominance signal may be able to be modulated at a higher amplitude and therefore at a higher data rate with the same error probability as the luminance signal. In general, however, more complicated equipment is required to modulate and demodulate a chrominance signal. More specifically, luminance and/or chrominance may be used to determine and a dominance parameter P.

In the example given above, the edges in an image are detected using the intensity of pixels along a horizontal line. This method is most effective in detecting vertical edges. If pixels-disposed along vertical lines or diagonal lines are compared, other edges can be detected as well as using the technique described.

In addition, or alternatively, movement of frame elements may also be detected and used to determine parameters P. For example, the pixels of one frame may be compared to pixels of one immediately subsequent frame. Differences in pixel luminance or chrominance indicate movement and can be used to modulate the amplitude of the data component as discussed above.

It is preferred that all encoding be on a per-field basis, that is, PN sequences do not bridge successive fields. The reason for this is that video signals may be edited, for example, when going from a TV show to a commercial, and data could be cut in the middle if PN sequences are not wholly contained in a single field.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

We claim:

1. A method of superimposing data on the visible portion of a video signal comprising the steps of:

(a) for each of a multiplicity of data symbols, assigning a respective chip pattern having more chips than the number of bits represented by said each data symbol, each chip pattern having a plurality of lines, each with a plurality of chips, to be superimposed on said video signal in paired lines having respective normal and inverse forms;

(b) analyzing an image defined by said video signal and forms of pixels to identify a data carrying parameter associated with each pixel;

(c) developing a chip characteristic table having digital values that represent the amplitudes of respective chips to be superimposed on said video signal at corresponding positions, each chip having a varying characteristic determined by said parameter;

(d) combining said video signals with said chips using the derived chip amplitudes into a composite signal; and (e) transmitting said composite video signal.

2. The method of superimposing data on the visible portion of an output video signal in accordance with claim 1 further comprising the step of:

decoding said input composite video signal to derive a digital representation of said data.

3. The method of superimposing data on the visible portion of an output video signal in accordance with claim 2 wherein chip characteristic table is used to include opposite polarity chips in paired lines in said output video signal.

4. The method of superimposing data on the visible portion of an output video signal in accordance with claim 3 wherein the decoding consists of deriving the difference of the integrals of the video signal operated upon over the course of each pair of opposite polarity chips, and statistically correlating each of said chip patterns with the integral differences to determine the highest correlation.

5. The method of superimposing data on the visible portion of an output video signal in accordance with claim 2 wherein the decoding (e) consists of deriving the difference of the integrals of the output video signal operated upon over the course of each of a pair of opposite polarity chips, and statistically correlating each of said chip patterns with the integral differences to determine the highest correlation.

6. The method of superimposing data on the visible portion of an output video signal in accordance with claim 1 wherein said characteristic table is deemed to modulate an amplitude of the video signal.

7. The method of claim 6 wherein a multi-valued amplitude is assigned to each chip.

8. The method of superimposing data on the visible portion of an output video signal in accordance with claim 1 further including the steps of decoding said input video signal to derive a digital representation of any original data superimposed thereon, eliminating said original data from said output video signal, combining said original data with new data to derive composite data, and using said composite data to obtain the digital data.

9. The method of superimposing data on the visible portion of an output video signal in accordance with claim 8 wherein said chip characteristic table is used to include opposite polarity chips in paired lines in said output video signal.

10. The method of superimposing data on the visible portion of an output video signal in accordance with claim 8 wherein the decoding consists of deriving the difference of the integrals of the output video signal operated upon over the course of each of a pair of opposite polarity chips, and statistically correlating each of said chip patterns with the integral differences to determine the highest correlation.

11. A method of superimposing data on the visible portion of a video signal comprising the steps of:

(a) converting an input video signal to a digital representation thereof to define a plurality of sequential fields;

(b) for each of a multiplicity of data symbols, assigning a respective chip pattern having more chips than the number of bits represented by said each data symbol, each chip pattern having a plurality of lines, each with a plurality of chips, to be superimposed on said video signal in paired lines having respective normal and inverse forms said chip pattern extending over more than one field;

(c) developing a chip amplitude table having digital values that represent the values of respective chips to be superimposed on said video signal at corresponding positions thereof; and (d) generating an output video signal from the digital representation of said input video signal and the chip values represented in said chip amplitude table at the corresponding positions thereof.

12. The method of superimposing data on the visible portion of an output video signal in accordance with claim 11 further comprising the step of:

(e) decoding said input video signal to derive a digital representation of any data superimposed thereon; and wherein step (d) includes the additional utilization of the digital representation derived in step (e).

13. The method of superimposing data on the visible portion of an output video signal in accordance with claim 12 wherein in step (d) said chip amplitude table is used to include opposite polarity chips in paired lines in said output video signal.

14. The method of superimposing data on the visible portion of an output video signal in accordance with claim 13 further including the steps of decoding said input video signal to derive a digital representation of any original data superimposed thereon, eliminating said original data from said output video signal, combining said original data with new data to derive composite data, and using said composite data in executing step (d).

15. The method of superimposing data on the visible portion of an output video signal in accordance with claim 11 wherein in step (d) said chip amplitude table is used to include opposite polarity chips in paired lines in said output video signal.

16. A method of superimposing data on the visible portion of a video signal comprising the steps of:
   (a) for each of a multiplicity of data symbols, assigning a respective chip pattern having more chips than the number of bits represented by said each data symbol, each chip pattern having a plurality of lines, each with a plurality of chips, to be superimposed on said video signal in paired lines having respective normal and inverse forms;
   (b) generating a data carrying parameter based on said vide signal, said parameter having several sequential values for each of said chips;
   (c) modulating an amplitude of said chips in accordance with said parameter;
   (d) developing a composite digital representation of said video signal and the chip pattern corresponding to the data symbols to be superimposed on said video signal; and
   (e) generating a video signal from said composite digital representation.

17. The method of superimposing data on the visible portion of a video signal in accordance with claim 16 further including the steps of:
   (f) decoding said video signal prior to the execution of step (d) to determine any data originally superimposed thereon; and
   (g) utilizing the data decoded in step (f) to partially determine the data symbols to be superimposed on said video signal.

18. The method of superimposing data on the visible portion of a video signal in accordance with claim 17 wherein in step (d) the chip patterns representing any original data determined in step (f) are eliminated from said digital representation.

19. A method of decoding data represented in the visible portion of a video signal, said video signal including for each of a multiplicity of data symbols a corresponding chip pattern having more chips than the number of bits represented by the respective data symbol, each chip pattern having a plurality of lines each with a plurality of chips superimposed on said video signal arranged in paired lines having respective normal and inverse forms each chip having an amplitude which is not necessarily intact through the duration of the chip; comprising the steps of:

(a) deriving an integrated chip value for each position in each pair of lines in the lines representing a chip pattern corresponding to a single data symbol;
(b) correlating the integrated chip values derived for a single data symbol with all chip patterns corresponding to respective ones of said multiplicity of data symbols; and
(c) identifying the data symbol represented in the visible portion of said video signal in accordance with that chip pattern having the highest correlation with said data symbol.

20. The method of decoding data represented in the visible portion of a video signal in accordance with claim 19 wherein step (b) includes the sub-steps of:
   (b1) for each of said chip patterns, increasing the value stored in a respective correlation accumulator by an integrated chip value if the corresponding chip in the pattern has a first polarity, and
   (b2) for each of said chip patterns, decreasing the value stored in a respective correlation accumulator by an integrated chip value if the corresponding chip in the pattern has a second polarity.

21. The method if of claim 20 further comprising providing a plurality of test arrays with test values, and using said test values to assign a pattern for each chip.

22. The method of decoding data represented in the visible portion of a video signal in accordance with claim 20 wherein any integrated chip value which does not exceed said first threshold level increases by an extra amount the correlation for the chip pattern being correlated if it and the previous integrated chip value have polarities that both match the polarities of the two chips in the chip pattern being correlated.

23. The method of decoding data represented in the visible portion of a video signal in accordance with claim 22 wherein any integrated chip value which increases by an extra amount the correlation for the chip pattern being correlated increases it by an even greater amount if for the chip pattern being correlated said integrated chip value and the previous integrated chip value have different polarities.

24. The method of decoding data represented in the visible portion of a video signal in accordance with claim 19 wherein any integrated chip value which exceeds a first threshold level is not used directly in the correlating of step (b), but is instead used as part of a difference function together with the previous integrated chip value if the difference function does not exceed a second threshold level and the chip pattern being correlated has opposite polarity chips in positions corresponding to said any integrated chip value and the previous integrated chip value.

25. The method of decoding data represented in the visible portion of a video signal in accordance with claim 19 wherein any integrated chip value which does not exceed said first threshold level increases by an extra amount the correlation for the chip pattern being correlated if it and the previous integrated chip value have polarities that both match the polarities of the two chips in the chip pattern being correlated.

26. The method of decoding data represented in the visible portion of a video signal in accordance with claim 25 wherein any integrated chip value which increases by an extra amount the correlation for the chip pattern being correlated increases it by an even greater amount if for the chip pattern being correlated said integrated chip value and the previous integrated chip value have different polarities.

27. A method of encoding data in the visible portion of a transmitted video signal without degrading display of the received video signal and for decoding said data in the received video signal, comprising the steps of:

(a) selecting for a group of data bits to be transmitted an associated one of a number of longer predetermined PN sequences of chips;

(b) dividing the selected PN sequence of chips into a multiplicity of lines of chips, said multiplicity of lines exceeding the number of lines determining a video field, each said line having more than one chip;

(c) embedding each line of chips and its inverse, in pairwise fashion, in respective pairs of line scans of said video signal prior to its transmission, (d) operating on received pairs of line scans to detect the lines of chips represented thereby, (e) correlating each of said number of chip sequences with said detected line of chips to derive a correlation magnitude therefor, and (f) selecting the chip sequence with the largest correlation magnitude as the chip sequence that was transmitted.

28. The method in accordance with claim 27 wherein in step (c) the two possible values of a chip cause changes in a characteristic of the video signal in respective opposite directions.

29. A method in accordance with claim 28 wherein in step (d) one line scan in each pair of line scans operated upon is subtracted from the other line scan in the same pair in order to reduce the effect of the video signal on, and to increase the amplitude of, the detected line of chips.

30. A method in accordance with claim 28 wherein each line scan is operated upon in step (d) by deriving an integration function for each chip, and each chip function for one line scan is subtracted from a chip function for a correspondingly positioned chip in the paired line scan.

31. A method in accordance with claim 27 wherein in step (d) one line scan in each pair of line scans operated upon is subtracted from the other line scan in the same pair in order to reduce the effect of the video signal on, and to increase the amplitude of, the detected line of chips.

32. A method of decoding data represented in the visible portion of a video signal, said video signal including for each of a multiplicity of data symbols a corresponding chip pattern having more chips than the number of bits represented by the respective data symbol, each chip pattern having a plurality of lines each with a plurality of chips superimposed on said video signal arranged in paired lines having respective normal and inverse forms each chip having an amplitude which is not necessarily intact through the duration of the chip; comprising the steps of:

(a) deriving an integrated chip value for each position in each pair of lines in the lines representing a chip pattern corresponding to a single data symbol;

(b) correlating the integrated chip values derived for a single data symbol with all chip patterns corresponding to respective ones of said multiplicity of data symbols;

(c) identifying the data symbol represented in the visible portion of said video signal in accordance with that chip pattern having the highest correlation with said data symbol; and (d) providing a plurality of test arrays with test values, and using said test values to assign a pattern for each chip.

33. A method of encoding data in the visible portion of a transmitted video signal without degrading display of the received video signal and for decoding said data in the received video signal, comprising the steps of:

(a) selecting for a group of data bits to be transmitted an associated one of a number of longer predetermined PN sequences of chips;

(b) dividing the selected PN sequence of chips into a multiplicity of lines of chips, said multiplicity of lines exceeding the number of lines determining a video field, each said line having more than one chip;

(c) embedding each line of chips and its inverse, in pairwise fashion, in respective pairs of line scans of said video signal prior to its transmission, (d) operating on received pairs of line scans to detect the fines of chips represented thereby, (e) correlating each of said number of chip sequences with said detected line of chips to derive a correlation magnitude therefor, and (f) selecting the chip sequence with the largest correlation magnitude as the chip sequence that was transmitted;

wherein each line scan is operated upon in step (d) by deriving an integration function for each chip, and each chip function for one line scan is subtracted from a chip function for a correspondingly positioned chip in the paired line scan.

34. A method in accordance with claim 33 wherein in step (d) one line scan in each pair of line scans operated upon is subtracted from the other line scan in the same pair in order to reduce the effect of the video signal on, and to increase the amplitude of, the detected line of chips.

* * * * *